United States Patent
Ali et al.

(10) Patent No.: US 9,530,079 B2
(45) Date of Patent: Dec. 27, 2016

(54) POINT SPREAD FUNCTION CLASSIFICATION USING STRUCTURAL PROPERTIES

(71) Applicant: NIKON CORPORATION, Tokyo (JP)

(72) Inventors: Gazi Ali, Mountain View, CA (US); Li Hong, San Diego, CA (US); Radka Tezaur, Belmont, CA (US); Mark Takita, Belmont, CA (US)

(73) Assignee: NIKON CORPORATION (JP)

( * ) Notice: Subject to any disclaimer, the term of this patent is extended or adjusted under 35 U.S.C. 154(b) by 0 days.

(21) Appl. No.: 14/437,953

(22) PCT Filed: Mar. 7, 2013

(86) PCT No.: PCT/US2013/029609
§ 371 (c)(1),
(2) Date: Apr. 23, 2015

(87) PCT Pub. No.: WO2014/074137
PCT Pub. Date: May 15, 2014

(65) Prior Publication Data
US 2015/0294186 A1  Oct. 15, 2015

Related U.S. Application Data (60) Provisional application No. 61/724,494, filed on Nov. 9, 2012.

(51) Int. Cl.
*G06K 9/00* (2006.01)
*G06K 9/62* (2006.01)
(Continued)

(52) U.S. Cl.
CPC ............ *G06K 9/626* (2013.01); *G06K 9/40* (2013.01); *G06K 9/52* (2013.01); *G06K 9/525* (2013.01);
(Continued)

(58) Field of Classification Search
None
See application file for complete search history.

(56) References Cited

U.S. PATENT DOCUMENTS

| 6,347,153 B1 | 2/2002 | Triplett et al. |
| 6,928,182 B1 | 8/2005 | Chui et al. |

(Continued)

FOREIGN PATENT DOCUMENTS

| JP | 2009049777 A1 | 5/2009 |
| WO | 2012034467 A1 | 3/2012 |

(Continued)

OTHER PUBLICATIONS

Su, et al. (Blurred Image Region Detection and Classification), ACM, 2011, pp. 13971400.*

(Continued)

*Primary Examiner* — Daniel Mariam
(74) *Attorney, Agent, or Firm* — Roeder & Broder LLP; Steven G. Roeder (57) ABSTRACT

A method for classifying a test image (16) includes the steps of building a classifier (300), and classifying the test image (16) with the classifier (300). After the test image (16) is classified, the test image (16) can be subsequently processed (e.g. deblurred) with improved accuracy. The classifier (300) can classify and distinguish between PSF features associated with motion blurred images, and PSF features associate with defocus blurred images. The classifier (300) can be built using a plurality of training images (304), and extracting one or more training features from each the training images (304). The PSF features can include image moments of the point spread function, and/or geometric features of the point spread function.

19 Claims, 8 Drawing Sheets

(51) Int. Cl.
 *G06K 9/40* (2006.01)
 *G06K 9/52* (2006.01)
 *G06T 5/00* (2006.01)
 *G06T 7/20* (2006.01)

(52) U.S. Cl.
 CPC ........... *G06K 9/6201* (2013.01); *G06K 9/6256* (2013.01); *G06K 9/6286* (2013.01); *G06T 5/003* (2013.01); *G06T 7/20* (2013.01); *G06T 2207/20201* (2013.01)

(56) References Cited

U.S. PATENT DOCUMENTS

| | | | |
|---|---|---|---|
| 7,920,729 | B2 | 4/2011 | Avinash et al. |
| 8,068,687 | B2 * | 11/2011 | Nishiyama ......... G06K 9/00228 348/169 |
| 8,073,263 | B2 * | 12/2011 | Hull ................. G06F 17/30247 382/224 |
| 8,737,761 | B2 | 5/2014 | Zhang et al. |
| 8,805,112 | B2 | 8/2014 | Hong |
| 2001/0016054 | A1 | 8/2001 | Banker et al. |
| 2004/0218914 | A1 | 11/2004 | Sato |
| 2005/0083517 | A1 | 4/2005 | Asad et al. |
| 2008/0317357 | A1 | 12/2008 | Steinberg et al. |
| 2009/0067742 | A1 | 3/2009 | Lim et al. |
| 2009/0196524 | A1 | 8/2009 | Godin |
| 2010/0272356 | A1 | 10/2010 | Hong |
| 2011/0019909 | A1 | 1/2011 | Farid et al. |
| 2011/0057383 | A1 | 3/2011 | Harashina |
| 2012/0105655 | A1 | 5/2012 | Ishii et al. |
| 2012/0159404 | A1 | 6/2012 | Vasireddy et al. |
| 2012/0162448 | A1 | 6/2012 | Au et al. |
| 2013/0121609 | A1 | 5/2013 | Zhang et al. |
| 2013/0169824 | A1 | 7/2013 | Hong et al. |
| 2014/0078320 | A1 | 3/2014 | Hong |

FOREIGN PATENT DOCUMENTS

| | | |
|---|---|---|
| WO | 2012060835 A1 | 5/2012 |
| WO | 2013025220 A1 | 2/2013 |
| WO | 2014074137 A1 | 5/2014 |
| WO | 2014074138 A1 | 5/2014 |

OTHER PUBLICATIONS

The International Preliminary Report on Patentability, PCT/US13/29609, Nikon Corporation, May 12, 2015 (related application).

The International Preliminary Report on Patentability, PCT/US13/29655, Nikon Corporation, May 12, 2015.

The International Search Report and Written Opinion, PCT/US10/55325, Nikon Corporation, Dec. 30, 2010.

The International Preliminary Report on Patentability, PCT/US10/55325, Nikon Corporation, May 7, 2013.

The International Search Report and Written Opinion, PCT/US11/48218, Nikon Corporation, Apr. 23, 2012.

The International Preliminary Report on Patentability, PCT/US11/48218, Nikon Corporation, Feb. 18, 2014.

The International Search Report and Written Opinion, PCT/US13/29609, Nikon Corporation, May 10, 2013.

The International Search Report and Written Opinion, PCT/US13/29655, Nikon Corporation, May 13, 2013.

Hirsch, et al. "Fast Removal of Non-Uniform Camera Shake", IEEE International Conference on Computer Vision, 2011.

Whyte, et al. "Non-uniform Deblurring for Shaken Images", CVPR, 2010.

Kumar, et al. "Real-Time Affine Global Motion Estimation Using Phase Correlation and its Application for Digital Image Stabilization", IEEE Trans. on Image Processing, Dec. 2011.

Aizenberg, et al. "Blur Identification by Multilayer Neural Networks Based on Multivalued Neurons," IEEE Transactions on Neural Networks, vol. 19, No. 5, pp. 883-898, May 2008.

Liu, et al. "Image Partial Blur Detection and Classification," IEEE Conference on Computer Vision and Pattern Recognition, IEEE, 2008.

Flusser, et al. "Image Features Invariant With Respect to Blur," Pattern Recognition, vol. 28, No. 11, pp. 1723-1732, 1995.

U.S. Appl. No. 14/437,966, filed Apr. 23, 2015, Nikon Corporation, with its entire prosecution and case history.

* cited by examiner

POINT SPREAD FUNCTION CLASSIFICATION USING STRUCTURAL PROPERTIES

RELATED APPLICATION

This application claims priority on Provisional Application Ser. No. 61/724,494 filed on Nov. 9, 2012, entitled "Point Spread Function Classification Using Structural Properties". As far as is permitted, the contents of U.S. Provisional Application Ser. No. 61/724,494 are incorporated herein by reference.

BACKGROUND

Cameras are commonly used to capture an image of a scene that includes one or more objects. Unfortunately, some of the images are blurred. For example, movement of the camera, and/or movement of the objects in the scene during the exposure time of the camera can cause the image to be blurred. Further, the improper focus of the camera can cause the image to be blurred.

A blurred captured image can be modeled as the convolution of a latent sharp image with some point spread function ("PSF") plus noise, $$B = K*L + N. \qquad \text{Equation (1)}$$

In Equation 1 and elsewhere in this document, B denotes a blurry image, L a latent sharp image, K a PSF kernel, and N represents noise (including quantization errors, compression artifacts, etc.). The inverse problem of recovering both the latent sharp image L and the PSF kernel K when only the blurry image B is known, is called a blind deconvolution problem.

Many blurry images include areas that further complicate the problem of determining the PSF kernel K and the latent sharp image L. For example, certain areas of a blurry image B will have a different blur PSF kernel. Thus, it is often very difficult to accurately determine the PSF kernel K and the latent sharp image L of a blurry image.

SUMMARY

The present invention is directed to a method for classifying a test image. In one embodiment, the method includes the step of building a classifier that distinguishes motion blur features from defocus blur features. Stated in another fashion, the classifier distinguishes between training features from training images with motion blur, and training features from training images with defocus blur. Thus, the structural properties of the PSFs of training images can be used to build the classifier.

Further, the method can include the step of classifying the test image with the classifier. Thus, the structural properties of the PSF of the test image can be used to classify the test image.

In certain embodiments, the classifier is a PST classifier that was built using PSF features from a plurality of training images. In this embodiment, one or more PSF features from the PSF of the test image are compared to the training PSF features in the classifier to classify the test image. With this design, in certain embodiments, after the test image is classified, the test image can be subsequently processed (e.g. deblurred) with improved accuracy.

As provided herein, the point spread functions carry important information about the image formation process in a captured image. It can be interpreted as transfer function that maps 3-D scene structure into 2-D image sensor. Based on the capturing condition, scene structure, optical properties of the camera, the PSF changes its characteristics. There are known methods to extract PSF from a captured image; the extracted PSF is then used for various post processing algorithms e.g. image restoration, optical artifact correction, resolution enhancement, depth map generation etc. The present invention automatically classifies the extracted or estimated PSFs so that the proper PSFs can be used according to the application requirement. This classification method makes a meaningful connection between the PSF estimation method and intended image processing algorithms. The idea can be used under different capturing conditions and different intended applications.

In certain embodiments, the classifier can classify and distinguish motion blur PSF features from defocus blur PSF features. Further, the step of building a classifier can include the steps of (i) providing a plurality of training images, and (ii) extracting training image features for each of the training images. As non-exclusive examples, the training image features can include image moments and/or geometric features of the PSF.

In one embodiment, the step of classifying the test image includes the steps of (i) calculating a point spread function for at least a portion of the test image, and (ii) extracting test features from the test point spread function. As non-exclusive examples, the test features can include image moments of the test PSF, and/or geometric features of the test PSF.

Further, the step of classifying can include the step of comparing the test features to the training features in the classifier (e.g. motion blur PSF features and the defocus blur PSF features).

In yet another embodiment, the present invention is directed to a method comprising the steps of: (i) calculating a point spread function for the test image; (ii) extracting a test PSF feature from the test image point spread function; and (iii) comparing the test PSF feature to a classifier generated with a plurality of training PSF features.

The present invention is also directed to a device that performs the functions described herein.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
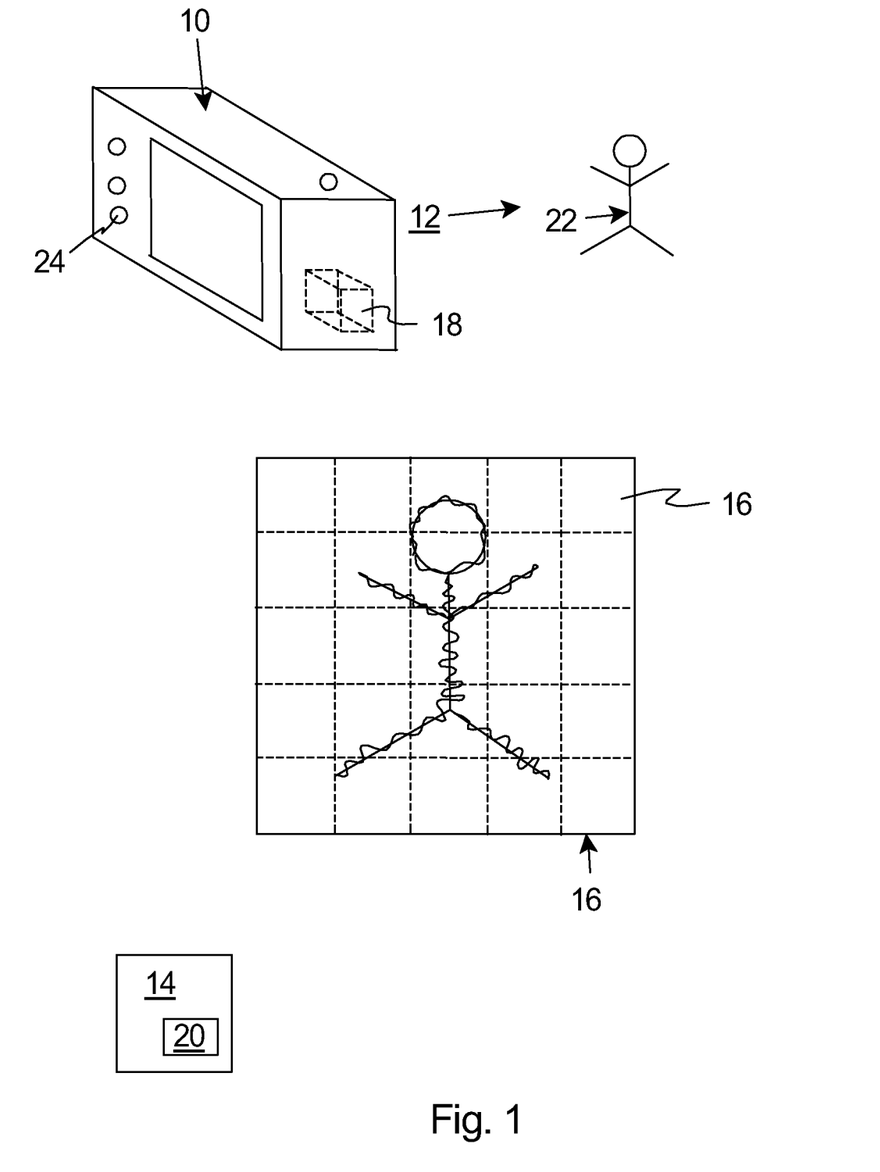
FIG. 1 is a simplified view of a scene, a computer having features of the present invention, an image apparatus having features of the present invention, and a captured image of the scene.

FIG. 1 is a simplified perspective view of an image apparatus 10 (e.g. a digital camera), a scene 12, and a computer 14 (illustrated as a box). FIG. 1 also illustrates a captured image 16 (sometimes referred to as a "test image"). In FIG. 1, the captured image 16 is intended to illustrate a blurry image (represented as wavy lines) captured by the camera 10.

As an overview, in certain embodiments, the present invention is directed a system and method for building a unique classifier from a plurality of training images. Additionally, or alternatively, the present invention is directed to a system and method for classifying one or more test images 16 using the unique classifier. With this design, in certain embodiments, after the test image 16 is classified with the classifier, the test image 16 can be subsequently processed (e.g. deblurred) with improved accuracy.

As provided herein, based on the capturing condition, scene structure, optical properties of the camera, the PSF changes its characteristics. There are known methods to extract the PSF from the captured image 16. The present invention automatically classifies the extracted or estimated PSFs from one or more captured images 16 so that the proper PSFs can be used according to the application requirement. This classification method makes a meaningful connection between the PSF estimation method and intended image processing algorithms.

In one embodiment, as provided herein, the image apparatus 10 can include a control system 18 that uses one or more of the algorithms for performing the steps provided herein. Alternatively, the computer 14 can include a control system 20 that uses one or more of the algorithms provided herein. As alternative examples, the computer 14 can access the algorithms for performing the classification and deblurring from its memory or from a website.

Each control system 18, 20 can include one or more processors and circuits. Further, each of the control systems 18, 20 can include software that utilizes one or more methods provided herein.

It should be noted that the present algorithms used herein can be efficiently solved. This will speed up the deblurring of images and will allow for image deblurring with less powerful processors (e.g. in camera processing with camera control system 18).

The type of scene 12 captured by the image apparatus 10 can vary. For simplicity, in FIG. 1, the scene 12 is illustrated as including one object 22, e.g. a simplified stick figure of a person. Typically, however, the scene 12 will include multiple objects.

It should be noted that movement of the image apparatus 10 and/or movement of the object 22 in the scene 12 during the capturing of an image will cause motion blur in the image 16. Alternatively, if the image apparatus 10 is not properly focused when the image 16 is captured, the image 16 will have defocus blur. A blurry image 16 can include either or both motion blur and defocus blur.

It should be noted that the entire test image 16 can be classified and processed as a single unit. Alternatively, the test image 16 can be divided into a plurality of image regions 17 (illustrated with dashed lines), with a separate PSF being calculated for one or more of the image regions 17, and separate processing being performed on one or more of the image regions 17. In FIG. 1, the test image 16 is divided into twenty-five, square image regions 17. Alternatively, the number and/or shape of the image regions 17 can be different than that illustrated in FIG. 1.

Moreover, the image apparatus 10 can include one or more control switches 24 that allow the user to control the functions of the image apparatus 10. For example, one or more of the control switches 24 can be used to selectively switch the image apparatus 10 to the image processing (e.g. classification and/or deblurring) disclosed herein.

Figure 2:
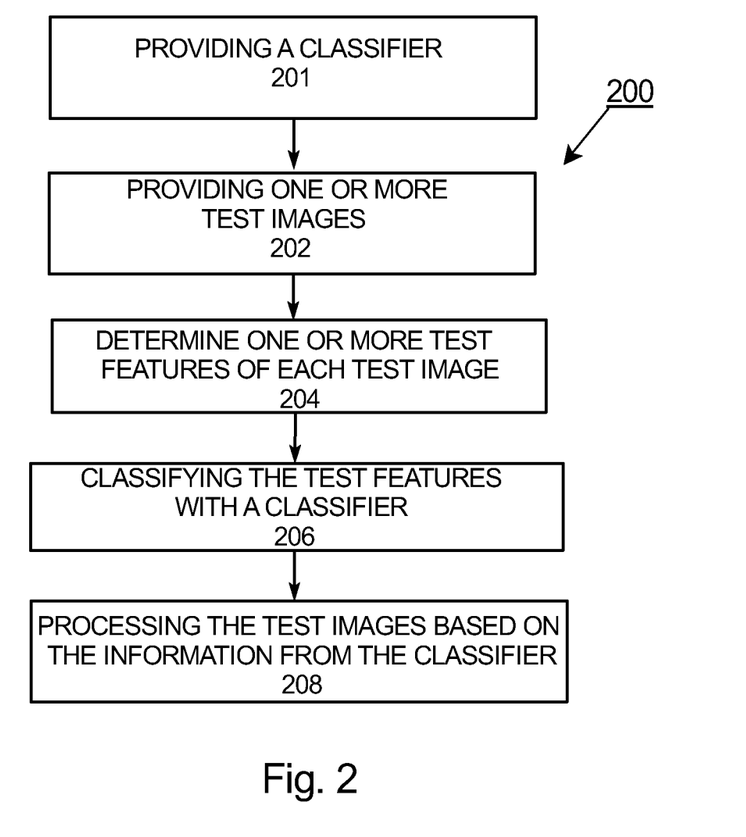
FIG. 2 is simplified flow chart that illustrates one embodiment of an image classification system having features of the present invention.
Figure 3:
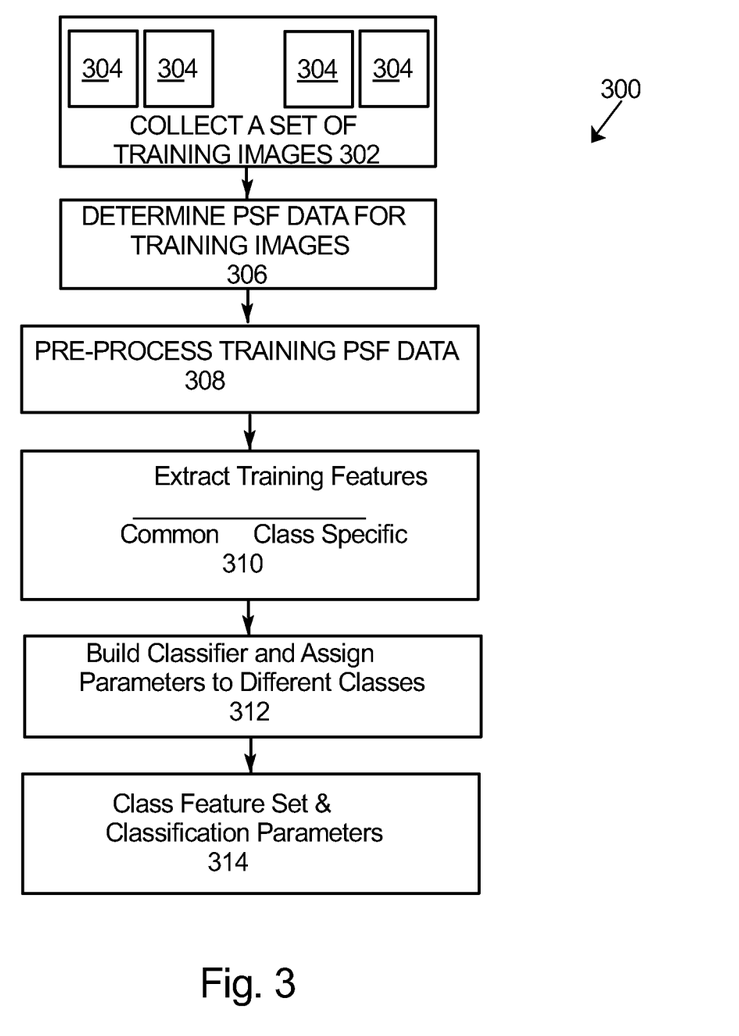
FIG. 3 is a simplified flow chart that illustrates one embodiment of a method for building a classifier having features of the present invention.

FIG. 2 is a simplified flow chart of one, non-exclusive embodiment of an image classification system 200 having features of the present invention. In this example, at step 201, a unique classifier is accessed (i) by the control system 18 (illustrated in FIG. 1) of the image apparatus 10 (illustrated in FIG. 1) for in camera image processing, or (ii) by the control system 20 (illustrated in FIG. 1) of the computer 14 (illustrated in FIG. 1). It should be noted that step 201 cannot be performed until the unique classifier is built. The design and building of the classifier is detailed in the discussion relating to FIG. 3 provided below. As an overview, in certain embodiments, the classifier can be built using one or more training features from one or more training images.

In FIG. 2, at step 202, one or more test images are provided to the control system for processing. In the example in which the control system 18 (illustrated in FIG. 1) of the image apparatus 10 (illustrated in FIG. 1) is performing the classification and/or processing, these test images can be captured by the image apparatus 10. Alternatively, if the control system 20 (illustrated in FIG. 1) of the computer 14 (illustrated in FIG. 1) is performing the classification and/or processing, these test images can be captured by the image apparatus 10 and transferred to the computer 14.

Figure 4:
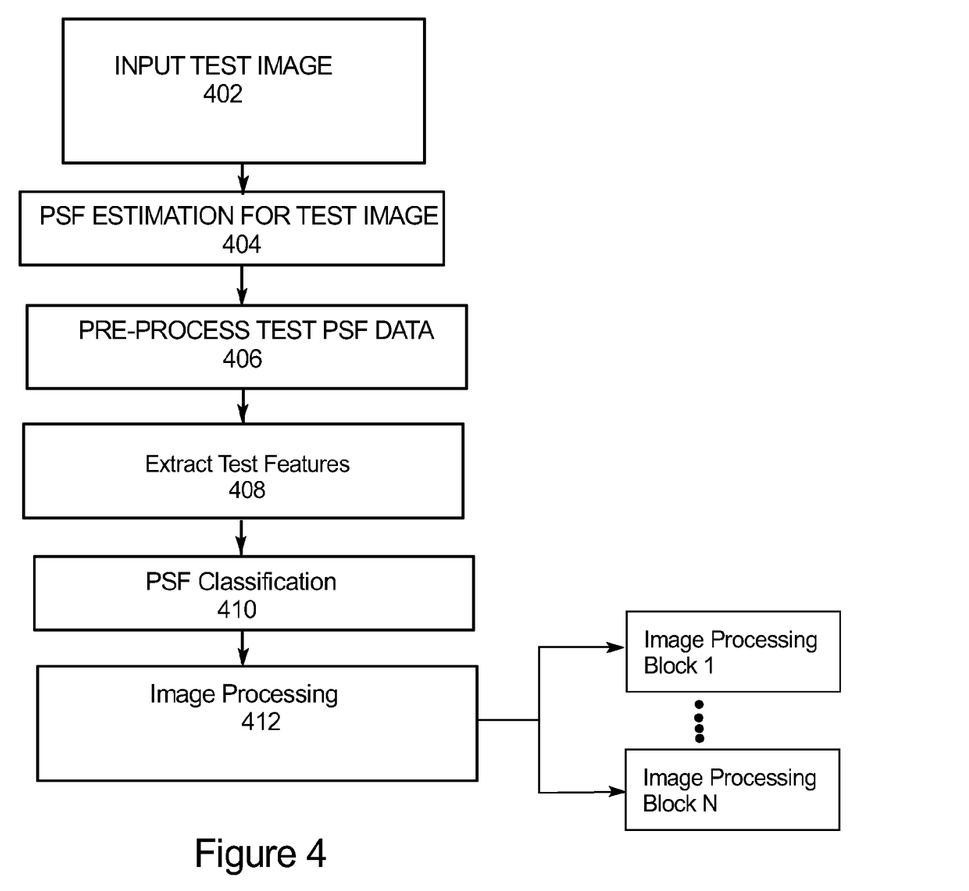
FIG. 4 is a simplified flow chart that illustrates a method for classification of a test image.

Next, at step 204, each of the test images is processed by one of the control systems 18, 20 to determine/generate one or more test features of each test image. The test features generated from each test image should correspond to the training features used to build the classifier. Possible test features include image moments and/or PSF geometric features. These test features are discussed in more detail in the discussion relating to FIG. 4 provided below.

Subsequently, in FIG. 2 at step 206, the test features of the test images can be classified with the unique classifier using one of the control systems 18, 20. Finally, at step 208, the test images can be processed (e.g. deblurred) based on the information from the classifier using the control systems 18, 20.

As provided above, in order to classify the one or more test images, the classifier has to first be built. FIG. 3 illustrates one non-exclusive embodiment of a method used for building a classifier 300. In this non-exclusive embodiment, the classifier 300 is a point spread function ('PSF") classifier that, in certain embodiments, distinguishes and categorizes multiple alternative, blurred image types based on their respective PSF. For example, the classifier 300 can at least categorize and distinguish the characteristics of the PSFs of motion blurred images from the characteristics of the PSFs of defocus blurred images. As is known, the PSF of a motion blurred image is generally sparse, while the PSF of a defocus blurred image is generally circular. In certain embodiments, the present invention utilizes the PSF characteristics of multiple images to build the classifier. Moreover, as provided herein, the classifier 300 can have a robust learning-based classification framework.

It should be noted that the building of the classifier 300 can be performed (offline) by a separate computer (not shown). Subsequently, the built classifier 300 can be loaded into the camera 10 (illustrated in FIG. 1) or the computer 14 (illustrated in FIG. 1) for subsequent usage. Alternatively, for example, the classifier 300 can be accessed from a website.

At step 302, a set of training images 304 (illustrated as boxes) are collected. Of this set, some of training images 304 can include defocus blurring, and some of the training images 304 can include motion blurring. The blur classification of each of training images 304 is known and provided to the classifier 300. For example, the blur classification can include a motion blur class and a defocus blur class. Some of the training images 304 can include both motion blur and defocus blur.

In one embodiment, one or more of the training images 304 can include one or more known images that are artificially blurred (with motion and/or defocus blur) so that the characteristics of the blurring is known. Further, in this example, the information required to deblur these training images 304 is also known.

The number of training images 304 can be varied. However, in general, a greater number of training images 304 used during a training phase of the classifier 300 will increase the accuracy during the classification phase. For example, hundreds or even thousands or more of blurry training images 304 can be used during the training phase.

At step 306, the point spread function data for each of the training images 304 is determined. For example, the PSF estimation for each training image 304 can be calculated using known methods. As a non-exclusive example, the algorithms used for solving the blind deconvolution problem estimate both the PSF kernel K and the latent sharp image L. One solution to the blind deconvolution problem is described in more detail with reference to the estimation of the PSF for the test image.

As provided herein, one or more of the training images can include a single PSF that is representative of the entire training image. Alternatively, one or more of the training images can be divided into a plurality of image regions, with a separate PSF being calculated for one or more of the image regions. The point spread function data from each training image can be referred to as the training PSF data.

In one non-exclusive example, depending upon the requirements of the application, the estimated PSFs are supplied based on PSF class. For example, if 'defocus' PSFs are needed for an application then only the PSF(s) that belong to the 'defocus' class will be transferred. Further, the exact image data used to calculate those training PSFs is also known.

As provided herein, (i) the training PSF data from the motion blurred training images can be used to build the motion blur portion ("class") of the classifier, and (ii) the training PSF data from the defocus blurred training images can be used to build the defocus blur portion ("class") of the classifier. Thus, the collected training PSF data can represent motion blur PSF and defocus blur PSF classes.

Next, at step 308, the collected training PSF data is pre-processed to make the training PSF data suitable for the extraction of the training features. Non-exclusive examples of pre-processing include, but are not limited to, binarization, cropping, thresholding, and/or re-normalization. For example, depending upon the type of training feature(s) utilized, a binary version of the training PSF data may be necessary. It should be noted that the pre-processing step may be optional.

Subsequently, at step 310, one or more training features (also referred to as "training PSF features") are extracted from the training PSF data (optionally preprocessed) of each of the training images. In the training feature extraction step, some common features and few class-specific features from the PSF data is collected. The common features are used to isolate different PSF hyper-planes in a unified data set. On the other hand, class specific features are used to increase the probability of detecting certain classes of PSFs. Common features include the area of the PSF. Class specific features include motion blur PSF features (typically very sparse) and defocus blur PSF features (typically circular).

The type of training features extracted from the training PSF data can be varied pursuant to the teachings provided herein. Non-exclusive examples of training features include image moments and PSF geometric features. Suitable training features are described in more detail below with reference to FIGS. 5A-9.

Next, at step 312, once the training features are determined and selected, the classifier can be built and classification parameters can be set to perform the subsequent classification of test image(s). The design of the classifier will depend upon the type of training features that are used to build the classifier. As non-exclusive examples, the classifier can be based on linear or non-linear hyper-planes (e.g. a Hu moment-classifier) and/or it can be based on a threshold (non-circle like classifier). Classifiers can use overlapping feature sets, e.g. Hu moment classifier and projection-classifier, since both use PSF projection data. Non-examples of a linear classifier and threshold based classifiers are described in more detail below.

Finally, at step 314, the set of training features and the corresponding classifier is built using an offline training based method. The parameters associated with the feature-classifier sets are stored so that it can be used during the on line process.

In certain embodiments, the classifier is trained based on the PSF features of defocused and motion blurred training images. In this embodiment, the classifier is aiming to capture the difference between features of defocus blur PSF and motion blur PSF.

After the classifier is built, the classifier can subsequently be used by one of the control system 18, 20 to classify one or more test images 16. The PSF classification application is described in more detail below with reference to FIG. 4.

First, at step 402, the blurred test image is provided to the control system 18, 20.

Subsequently, at step 404, the control system 18, 20 estimates the PSF for the test image. It should be noted that a single PSF can be estimated for the entire image. Alternatively, the test image can be divided into a number of image regions, and a separate PSF can be estimated for one or more of the image regions. In this example, the test image will include multiple PSFs.

The PSF estimation can be performed using known methods. As a non-exclusive example, the algorithms used for solving the blind deconvolution problem estimate both the PSF kernel K and the latent sharp image L. These algorithms are iterative and usually they alternate, improving the current estimates of the PSF and the latent sharp image. The steps of improving the current estimates of the PSF and the current estimate of the latent sharp image are typically in the form of solving an optimization problem. More specifically, for blind deconvolution, (i) a cost function is formulated and minimized to find a solution for image deconvolution, and (ii) a cost function is formulated and minimized to find a solution for the PSF blur kernel estimate.

One common approach to image deconvolution is re-formulating it as a regularized least squares problem, and the minimization of a cost function that has the following form:

$$c(L) = \|K*L - B\|_2^2 + p(\|D_x*L\|_2^2 + \|D_y+L\|_2^2). \quad \text{Equation (2)}$$

In Equation 2, the term $\|K*L-B\|_2^2$ is considered a fidelity term that makes the latent sharp image L conform to the model in Equation (1) with the noise as small as possible. Further, in Equation 2, the term $(\|D_x*L\|_2^2 + \|D_y+L\|_2^2)$ is considered a regularization term that helps to deal with the ill-conditioned nature of the problem and noise magnification. The regularization term can be also interpreted as a form of infusing prior information about the image. As $(\|D_x*L\|_2^2 + \|D_y+L\|_2^2)$ is made small, the gradient of latent sharp image L is forced to be sparse, with most elements being zero or close to zero, which is one of the common properties exhibited by natural images.

Additionally, in Equation 2 and elsewhere in this document, (i) c(L) is the cost function for the latent sharp image, (ii) L is the latent sharp image, (iii) K is a PSF kernel, (iv) B is a blurry image, (v) $D_x$ and $D_y$ are the first order partial derivative operators and parameters, and (vi) p is a weight parameter that helps to a set proper balance between the fidelity and the regularization term so as to achieve the best compromise between the sharpness of recovered latent sharp image and the noise and other artifacts present in the reconstructed image.

Further, a common cost function for estimating the PSF kernel K can be re-formulated as a regularized least squares problem, and the minimization of a cost function that has the following form:

$$c(K) = \|K*D_x*L - D_x*B\|_2^2 + \|K*D_y*L - D_y*B\|_2^2 + \theta\|K\|_2^2). \quad \text{Equation (3)}$$

In Equation 3, the term $\|K*D_x*L-D_x*B\|_2^2$ and $\|K*D_y*L-D_y*B\|_2^2$ are considered fidelity terms that makes the latent sharp image L conform to the model in Equation (1) with the noise as small as possible. Further, in Equation 3, the term $\|K\|_2^2$ is considered a regularization term that helps to deal with ill-conditioned nature of the problem and noise magnification.

Moreover, in Equation 3, (i) c(K) is the cost function for the PSF kernel, and (ii) θ is a weight parameter that helps to set a proper balance between the fidelity and the regularization term so as to achieve the best compromise between the sharpness of recovered latent sharp image and the noise and other artifacts present in the reconstructed image. The regularization term can be also interpreted as a form of infusing prior information about the image to deal with ill-conditioned nature of the problem and noise magnification. Including $\|K\|_2^2$ in the cost function of c(K) that is minimized to find a new estimate of PSF kernel K forces most elements of K to be very small. It thus gives preference to sparse PSF kernels that have most elements equal to 0, which is desirable in the cases of blur such as motion blur when the non-zero elements in PSF form a curve corresponding to motion trajectory.

The fact that the differential operators tend to remove the correlation between the neighboring pixels of an image is also the reason for including derivatives in the fidelity terms of the cost function c(K) that is used for estimating PSF kernel K. This helps to make estimation more robust.

The minimization of cost functions c(L) and c(K) that have the form Equations (2) and (3), respectively, is a pair of regularized least squares problems. When K and L are rectangular arrays of the same size and periodic convolution is considered, both these regularized least squares problem have a closed form solution. The formulas for the solutions are $$L = F^{-1}\left(\frac{\overline{F(K)}F(B)}{|F(K)|^2 + p(|F(D_x)|^2 + |F(D_y)|^2)}\right) \quad \text{Equation (4)}$$

and $$K = F^{-1}\left(\frac{\overline{F(L)}(|F(D_x)|^2 + |F(D_y)|^2)F(B)}{|F(L)|^2 + \theta}\right), \quad \text{Equation (5)}$$

respectively. In Equations 4 and 5, the multiplication and division of arrays are both element-wise. Further, F denotes the operator of a two dimensional Fourier transform of a rectangular array using periodic extension, which can be implemented very efficiently via fast Fourier transform. As a result thereof, these closed form formulas allow for computing of the deconvolved image and the PSF relatively quickly.

Referring again to FIG. 4, at step 406, the test PSF data is pre-processed to make the test PSF data suitable for the extraction of certain of the test features. Non-exclusive examples of pre-processing include, but are not limited to, binarization, cropping, thresholding, and/or re-normalization. For example, depending upon the type of test feature(s) utilized, a binary version of the test PSF data may be necessary. It should be noted that the pre-processing step may be optional.

Subsequently, at step 408, one or more test features (also referred to as "test PSF features") are extracted from the test PSF data of the test image. The type of test features extracted from the test PSF data can be varied pursuant to the teachings provided herein. The test features extracted should correspond to the training features extracted from the training images. Non-exclusive examples of test features include image moments and PSF geometric features. Suitable test features are described in more detail below with reference to FIGS. 5A-9.

Next, at step 410, the values of test features are evaluated using the classifier to assign proper class label to the test image. For example, depending upon the value of the test features, the test image can be classified as motion blur or defocus blur. As a non-exclusive example, (i) if the test features of the test image correspond to the training features of a first type of motion blur, then the test image can be classified as having a first type of motion blur; (ii) if the test features of the test image correspond to the training features of a second type of motion blur, then the test image can be classified as having a second type of motion blur; (iii) if the test features of the test image correspond to the training features of a first type of defocus blur, then the test image can be classified as having a first type of defocus blur; and (iv) if the test features of the test image correspond to the training features of a second type of defocus blur, then the test image can be classified as having a second type of defocus blur.

For practical cases, it might be possible to have test PSF data that doesn't match any of the pre-defined (training) classes. Stated in another, fashion, the test features may not match (i) the training features of the motion blur class, or (ii) the training features of the defocus blur class. In order to handle such cases, the classification system can also include one or more 'unknown' class options. The test PSF data (and the test features) from an 'unknown' class might be used in the future to create a new class of PSF that might be of interest for other applications.

Additionally, in certain examples, the test image 16 can be divided into a plurality of image regions (as referred to as "image blocks"), with each image region can have different test features. In this example, each image region can be classified differently, and each image region can subsequently be processed differently. As an extreme example, if the test image is divided into four image regions, (i) a first image region can be classified as having a first type of motion blur; (ii) a second image region can be classified as having a second type of motion blur, (iii) a third image region can be classified as having a first type of defocus blur, and (iv) a fourth image region can be classified as having a second type of defocus blur.

Finally, at step 412, the image is processed based on the PSF classification determined by the classification system. As a non-exclusive example, if the test image is classified as having a first type of motion blur, the test image can be processed in a first fashion. Alternatively, if the test image is classified as having a second type of motion blur, the test image can be processed in another fashion. Still alternatively, if the test image is classified as having a first type of defocus blur, the test image can be processed in still another fashion. Moreover, if the test image is classified as having a second type of defocus blur, the test image can be processed in yet another fashion.

Still alternatively, if the test image 16 is divided into a plurality of image regions (as referred to as "image blocks"), each image region can be classified differently, and each image region can subsequently be processed differently. For the extreme example provided above, (i) if the first image region is classified as having a first type of motion blur, it can be processed in a first fashion; (ii) if the second image region is classified as having a second type of motion blur, it can be processed in another fashion, (iii) if the third image region is classified as having a first type of defocus blur, and it can be processed in still another fashion, and (iv) if the fourth image region is classified as having a second type of defocus blur, and it processed in yet another fashion.

It should be noted that the test image 16 can be divided into any number of image regions, and that FIG. 4 illustrates the processing of image block one through image block N.

The type of image processing done on the test image can vary. For example, the extracted PSF can be used for various post processing algorithms. Non-exclusive examples of image processing include, but is not limited to, image restoration, optical artifact correction, resolution enhancement, and depth map generation. For example, if it is desired to restore an image degraded by camera shake, then the PSFs from motion class can be used for restoration purpose. Similarly, an optical artifact removal algorithm will not need to consider PSFs from motion class and can utilize the PSFs that have more symmetric properties.

Subsequent test images can be classified and processed in a similar fashion. Multiple test images can be processed concurrently or separately.

In summary, in certain embodiments, the present invention provides a point spread function classification system that can be used to evaluate the test image 16 for subsequent processing. For example, after the test image 16 is evaluated relative to the PSF classification system 300, the blurred test image 16 can be processed more accurately.

The type of training PSF features utilized to build the classifier can vary pursuant to the teachings provided herein. Further, the test PSF features should correspond to the training PSF features. The training PSF features and the test PSF features can collectively be referred to as PSF features.

In one non-exclusive embodiment, the PSF features can be based on an image moment. In this example, force corresponds to intensity, and distance corresponds to the pixel location from the centroid of the PSF. A defocus blur PSF will be somewhat symmetric and the moments will be somewhat symmetric. Alternatively, a motion blur PSF will be somewhat sparse with great variations in the moments.

Figure 5A:
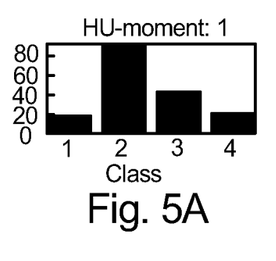
FIGS. 5A-5H illustrate a few Hu's moments for different PSF classes.
Figure 5B:
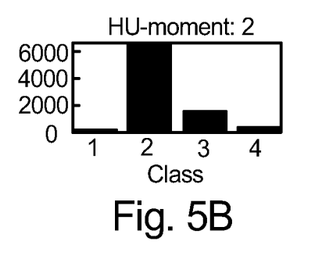
Figure 5C:
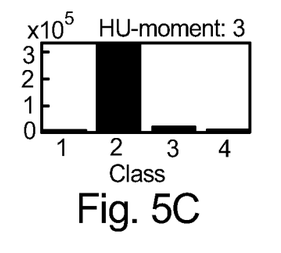
Figure 5D:
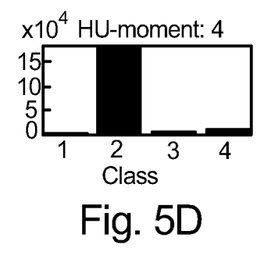
Figure 5E:
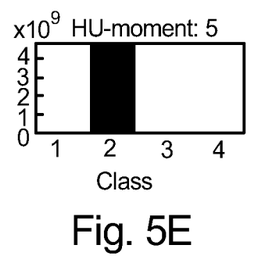
Figure 5F:
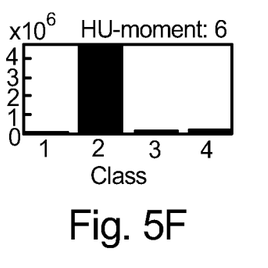
Figure 5G:
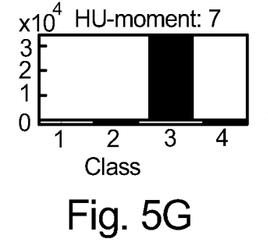
Figure 5H:
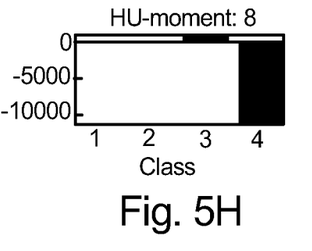

As one non-exclusive example, the image moment can be an invariant, normalized moment such as a Hu's moment. Hu's moments are a shape descriptor. These are invariant moments that can isolate different types of shapes. FIGS. 5A-5H illustrate that a few (e.g. eight in this example) of the Hu's moments for different PSF classes. More specifically, FIG. 5A illustrates the Hu moment 1 for different PSF classes; FIG. 5B illustrates the Hu moment 2 for different PSF classes; FIG. 5C illustrates the Hu moment 3 for different PSF classes; FIG. 5D illustrates the Hu moment 4 for different PSF classes; FIG. 5E illustrates the Hu moment 5 for different PSF classes; FIG. 5F illustrates the Hu moment 6 for different PSF classes; FIG. 5G illustrates the Hu moment 7 for different PSF classes; and FIG. 5H illustrates the Hu moment 8 for different PSF classes. Thus, in this example, eight Hu's moments are generated and divided into four different classes of PSFs.

In FIGS. 5A-5H, class 1 is defocus PSF, and classes 2-4 are motion PSF's from different sources. FIGS. 5A-5H illustrate that a few of the Hu's moments shows good discriminative properties to isolate motion and defocus PSF classes.

Figure 6:
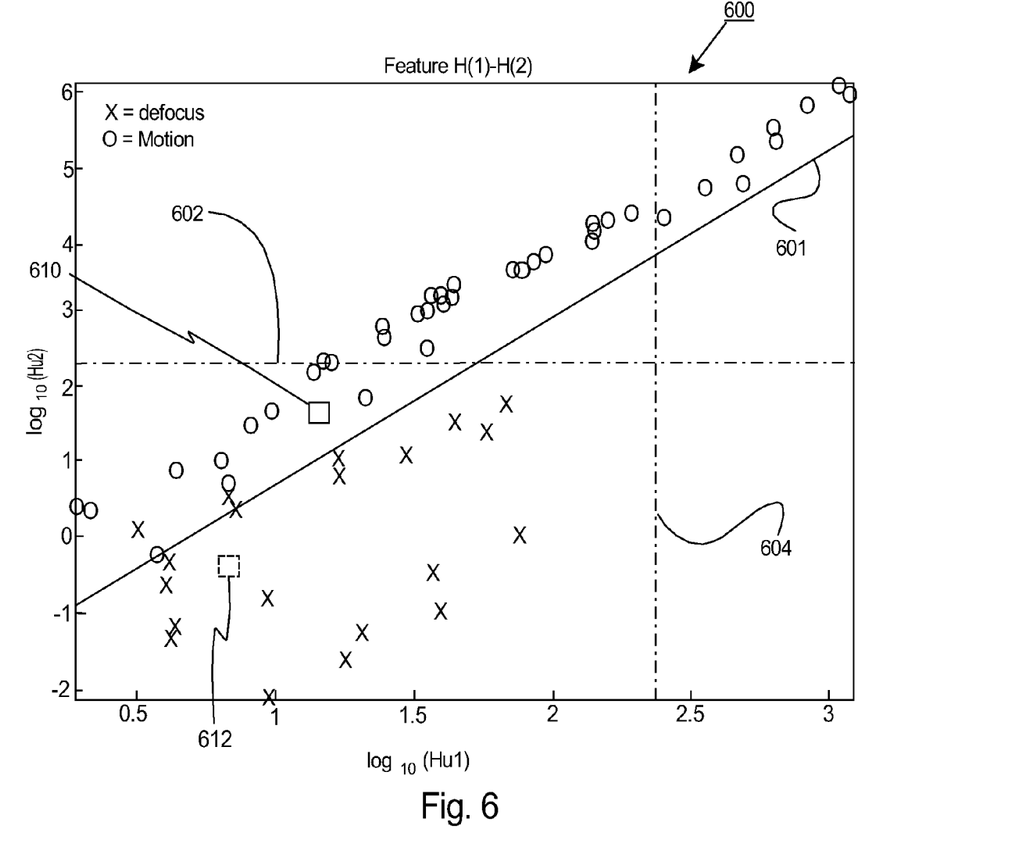
FIG. 6 is a simplified illustration of a linear classifier having features of the present invention.

In one embodiment, the feature set is selected to build the classifier. As a non-exclusive example, the Hu moment-1 (illustrated in FIG. 5A) and Hu moment-2 (illustrated in FIG. 5B) can be the training PSF features used to build the classifier. FIG. 6 is a simplified illustration of a linear classifier 600 that is built using the training PSF features which include the Hu moment-1 and Hu moment-2. Stated in another fashion, the classifier 600 is generated by (i) determining the Hu moment-1 and Hu moment-2 of the PSF for each training image (or portion thereof), and (ii) plotting the Hu moment-1 and Hu moment-2 of the PSF for each training image (or portion thereof) in a two dimensional graph. This graph illustrates the relationship between the Hu moment-1 and Hu moment-2 of the PSF for each training image (or portion thereof).

In FIG. 6, (i) each "X" represents the Hu moment-1 and Hu moment-2 of the PSF for a training image (or portion thereof) having defocus blur (a defocus PSF); and (i) each "O" represents the Hu moment-1 and Hu moment-2 of the PSF for a training image (or portion thereof) having motion blur (a motion PSF). With this design, there will be at least one "X" for each training image having defocus blur, and at least one "O" for each training image having motion blur. It should be noted that a training image can include multiple designations if the image is divided into image regions that have different PSFs.

As illustrated in FIG. 6, there is pretty good separation between the X's (the defocus blur features) and the O's (the motion blur features). Thus, this classifier 600 can be used to classify and distinguish motion blur PSF features from defocus blur PSF features.

Moreover, the graph illustrated in FIG. 6, includes a divider 601 that separates the majority of the X's (the defocus blur features) and the O's (the motion blur features). Stated in another fashion, in this example, the divider 601 is a class separator that separates the motion PSF class (above the divider 601) from the defocus PSF class (below the divider 601) in the Hu moment-1 and Hu moment-2 feature space. Because FIG. 6 is a two dimensional plot, the divider 601 can be a line. In FIG. 6, the classifier 600 is a linear classifier, and the divider 601 is a linear line that is defined by the formula y=mx+c (where m is the slope of the line, and c is the starting position along the Hu2 axis). Alternatively, the line can have another slope, another starting position, or the line can be curved (non-linear).

In this example, after the classifier is built, the PSF of the test image can be calculated. Subsequently, the Hu moment-1 and Hu moment-2 of the PSF of the test image can be calculated to generate the test PSF features. Next, these values can be plotted in classifier 600. As an example, (i) a solid box 610 represents the Hu moment-1 and Hu moment-2 values for a first test image, and (ii) a dashed box 612 represents the Hu moment-1 and Hu moment-2 values for a second test image. In this example, because the solid box 610 is above the divider 601, the first test image is classified as having motion blur. Further, because the dashed box 612 is below the divider 601, the second test image is classified as having defocus blur.

It should be noted that other Hu moments or other features can be used in the two dimensional classifier. As a non-exclusive example, the Hu moment-3 (illustrated in FIG. 5C) and Hu moment-4 (illustrated in FIG. 5D) can be used to build the classifier. Moreover, the present invention can be extended to higher dimension feature spaces. For example, the PSF features can include more than two Hu moments (e.g. Hu moment-1, Hu moment-2, and Hu moment-3). In this example, the classifier could be a three dimensional array, and the divider could be a plane that is used to separate the defocus PSFs from the motion PSFs. Still alternatively, the PSF features can include even more than three features to generate a multidimension classifier.

FIG. 6 also includes a horizontal, dashed line 602 that represents the threshold τ2 for the Hu moment 2, and a vertical, dashed line 604 that represents the threshold τ1 for the Hu moment 1. In another non-exclusive embodiment, it is possible to combine different classifiers that use total or sub-spaces of the feature set. For example, a two-step classifier can be used for the defocus class. More specifically, the Hu moment 1 and the Hu moment 2 can define a subspace for the defocus class. Additionally, in this example, the thresholds from Hu moment 1 through the Hu moment 4 can be used to restrict the subspace. Alternatively, more sophisticated classifiers can be used. In the previous example, a linear classifier is being used. Also, a Principal Component Analysis ("PCA") or a Support Vector Machine ("SVM") based classifiers can be used to give non-linear boundaries. This can increase the detection accuracy of the defocus class.

As an example, a first check for the Hu moment 1–Hu moment 2 ($Hu_1$–$Hu_2$) feature space can be expressed as follows:

$$y = m \times \log_{10}(Hu_{1_y}) + c \quad \text{(Equation 6)}$$

where m, c are obtained from the divider 601. In this example, if $y > \log_{10}(Hu_{2_y})$ then $PSF_y \in$ Defocus PSF class (the test image is classified as having defocus blur).

As an example of a second check, the Hu moment 1 through Hu moment 4 ($Hu_1$–$Hu_2$–$Hu_3$–$Hu_4$) feature space can be expressed as follows:

$$(\log_{10}(Hu_{1_y}) < \tau_1) \cap (\log_{10}(Hu_{2_y}) < \tau_2) \cap (\log_{10}(Hu_{3_y}) < \tau_3) \cap (\log_{10}(Hu_{4_y}) < \tau_4) \quad \text{(Equation 7)}$$

If this is true, then $PSF_y \in$ Defocus PSF class (the test image is classified as having defocus blur).

It should be noted that other PSF features (from the training and test images) can be used in addition to or alternatively to the image moment. For example, some of the geometric features of the PSF can be utilized. One of such PSF feature is the projection of the PSF data. For example, the point spread function data can be expressed two dimensionally as $P_{2D} = h(x_i|_{i=1}^m, y_j|_{j=1}^n)$. Further, the horizontal projection of the point spread function can be expressed as $$P_{horz}(j) = \frac{1}{m}\sum_{i=1}^{m} h(x_i, y_j), \; j = 1, 2, 3..., n.$$

Moreover, the vertical projection of the point spread function can be expressed as $$P_{vert}(i) = \frac{1}{n}\sum_{j=1}^{n} h(x_i, y_j), \; i = 1, 2, ..., m.$$

From the projection data it is also possible to create a cumulative histogram of the projected values. FIGS. 7A-7E illustrate the projection features for a defocus blur PSF, and FIG. 8A-8E illustrate the projection features for a motion PSF.

Figure 7A:
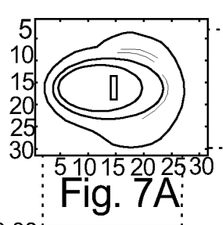
FIGS. 7A-7E illustrate projection features for a defocus blur point spread function.
Figure 7B:
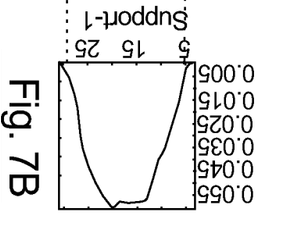
Figure 7C:
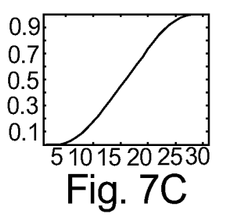
Figure 7D:
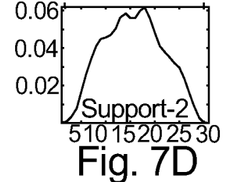
Figure 7E:
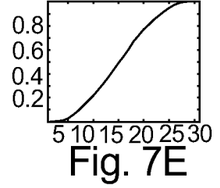

More specifically, FIG. 7A illustrates a defocus PSF; FIG. 7B is the horizontal projection of the defocus PSF of FIG. 7A; FIG. 7C is a cumulative histogram from the horizontal projection of FIG. 7B; FIG. 7D is the vertical projection of the defocus PSF of FIG. 7A; and FIG. 7E is a cumulative histogram from the vertical projection of FIG. 7D. Because this is a defocus PSF (having a somewhat circular pattern), the horizontal projection of the defocus PSF (illustrated in FIG. 7B) is somewhat similar to the vertical projection of the defocus PSF (illustrated in FIG. 7D). Further, the cumulative histogram from the horizontal projection of the defocus PSF (illustrated in FIG. 7C) is somewhat similar to the cumulative histogram from the vertical projection of the defocus PSF (illustrated in FIG. 7E).

Figure 8A:
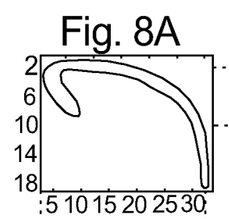
FIGS. 8A-8E illustrate the projection features for a motion blur point spread function.
Figure 8B:
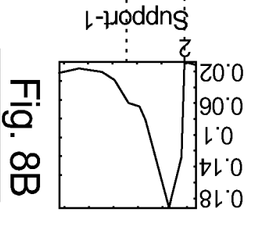
Figure 8C:
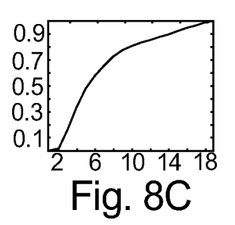
Figure 8D:
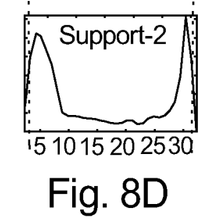
Figure 8E:
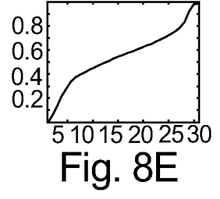

Somewhat similarly, FIG. 8A illustrates a PSF from the motion class; FIG. 8B is the horizontal projection of the motion PSF of FIG. 8A; FIG. 8C is a cumulative histogram from the horizontal projection of FIG. 8B; FIG. 8D is the vertical projection of the motion PSF of FIG. 8A; and FIG. 8E is a cumulative histogram from the vertical projection of FIG. 8D. Because this is a motion PSF (somewhat sparse pattern), the horizontal projection of the motion PSF (illustrated in FIG. 8B) is very different from the vertical projection of the motion PSF (illustrated in FIG. 8D). Moreover, the cumulative histogram from the horizontal projection of the motion PSF (illustrated in FIG. 8C) is very different from the cumulative histogram from the vertical projection of the motion PSF (illustrated in FIG. 8E).

FIGS. 7A-7E with FIGS. 8A-8E illustrate that projection based features are useful to determine certain properties of the PSF, such as the symmetry of the PSF, the energy concentration, the support of the PSF, and the sparse nature of the PSF. Thus, the projection features of the PSF can be used to build a classifier and subsequently used to classify test images. More specifically, the projection features from a number of training images can be used to build the classifier. Subsequently, the projection features from the test image can be used to classify the test image.

In yet another embodiment, other PSF features can be used in addition to or alternatively to the moment features, and/or projection features. For example, other geometric features of the PSF can be utilized. More specifically, the circular or non-circular shape of the PSF can be used as the PSF features. Typically, a defocus blur PSF is somewhat circular in shape, and a relatively large area. Alternatively, a motion blur PSF has a non-circular shape, is typically sparce, has an irregular shape, and has large perimeter with a relatively small area.

In this embodiment, the present invention calculates one or more PSF features of the PSF to determine if the PSF has a circular shape or a non-circular shape. In one example, for each PSF, one or more of the following PSF properties can be determined (i) an area of the PSF, (ii) a bounding box of the PSF, and/or (iii) a perimeter of the PSF. Subsequently, from this information, the control system can determine if the PSF has a circular shape or a non-circular shape.

Figure 9:
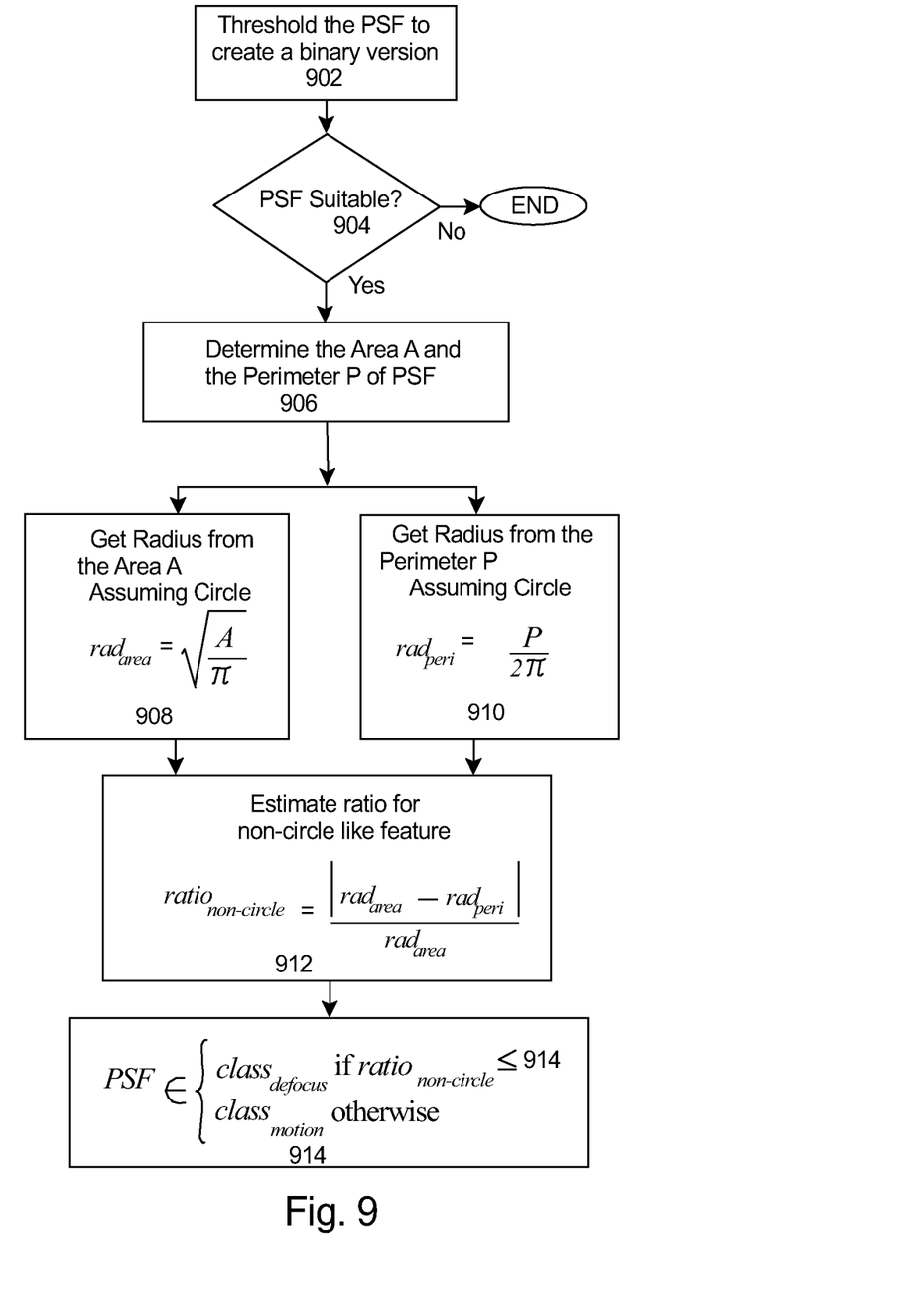
FIG. 9 is a flow chart that illustrates another method for calculating a geometric feature of a point spread function.

This method is described in more detail with reference to FIG. 9. At step 902, the PSF is thresholded to create a binary version of the PSF. Next, at step 904, the PSF is evaluated to determine if it is suitable for additional testing. For example, if the binary version of the PSF has many satellites or disconnected regions and the energy within those isolated satellites is not negligible then the input PSF might be from a corrupted estimate. If the PSF is determined not to be suitable ("No"), the process ends. Alternatively, if the PSF is determined to be suitable ("Yes"), at step 906, the area ("A") and the perimeter ("P") of the PSF are determined from the binary version of the PSF.

Subsequently, (i) at step 908 the radius of the PSF is calculated from the area of the PSF, assuming that the PSF is a circle, and (ii) at step 910, the radius of the PSF is also calculated from the perimeter of the PSF, assuming that the PSF is a circle. In this example, each PSF is initially assumed to have a circular shape. Subsequently, using the area for each PSF (if assumed to be circular), a radius for the PSF can be calculated. As is known, the area of a circle is equal to pi times the radius squared ($A = Pi \times r^2$). In the example provided above, if assumed to be circular, the radius of the PSF can be calculated using the area. Additionally, as is known, the perimeter of a circle is equal to 2 times pi times the radius. Thus, if assumed to be circular, the radius of the PSF can be calculated using from the perimeter.

Next at step 912, a non-circle ratio is calculated. As provided herein, for each PSF, if it is truly circular in shape, the radius calculated using the area is approximately equal to the radius calculated using the perimeter. Alternatively, for each PSF, if it is not a circle, the radius calculated using the area will differ greatly from the radius calculated using the perimeter.

For each PSF, the closer that the radius calculated using the area is to the radius calculated using the perimeter, the higher the probability that the potential PSF is a circle. Further, for each PSF, the greater difference that the radius calculated using the area is from the radius calculated using the perimeter, the higher the probability that the PSF is not a circle.

As a non-exclusive example, at step 912, the non-circle ratio can be calculated as the absolute value of the difference between the radius (calculated with the area) and the radius (calculated with the perimeter) and subsequently divided by the radius (calculated with the area).

Next, at step 914, the PSF of the test image is classified as being defocus blur or motion blur based on the non-circle ratio. In one embodiment, if the non-circle ratio is relatively small (e.g. less than a predetermined threshold "Th"), the probability is high that the PSF has a circular shape and is classified as defocus blur. Alternatively, if the non-circle ratio is relatively large (e.g. greater than the predetermined threshold), the probability is high that the PSF has a non-circular shape and is classified as motion blur. It should be noted that non-circle ratio from a number of training images can be used to build the classifier and establish the predetermined threshold. Subsequently, the predetermined threshold can be used to classify the PSF of the test image as either defocus blur or motion blur based on the value of the non-circle ratio of the PSF of the test image.

With this design, for each test image, if the probability is high that its PSF has a circular shape, that particular PSF is considered a defocus PSF. In contrast, for each test image, if the probability is high that its PSF does not have a circular shape, then, that PSF is considered a motion PSF.

It should be noted that other PSF features can be utilized.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for classifying a test image, the method comprising the step of:
   building a classifier that distinguishes motion blur features from defocus blur features; wherein building the classifier includes (i) providing a plurality of training images to a control system including a processor, (ii) analyzing the plurality of training images with the control system to determine a training image point spread function for at least a portion of each of the plurality of training images, and (iii) extracting, directly from each of the training image point spread functions determined by analyzing the training images, one or more training image features with the control system.

2. The method of claim 1 wherein the classifier distinguishes motion blur point spread function features from defocus blur point spread function features.

3. The method of claim 1 further comprising the step of classifying at least a portion of the test image with the classifier.

4. The method of claim 3 wherein the step of classifying includes the steps of analyzing the test image with the control system to extract one or more test image features from the test image, and comparing the one or more test image features to the classifier.

5. The method of claim 4 wherein the step of analyzing the test image with the control system to extract one or more test image features includes the step of analyzing the test image with the control system to calculate a test image point spread function for at least a portion of the test image, and extracting, directly from the test image point spread function determined by analyzing the test image, the one or more test image features with the control system.

6. The method of claim 1 wherein the training image features include image moments.

7. The method of claim 1 wherein the training image features include geometric features of the point spread function.

8. A method for classifying a test image utilizing a classifier that is built by determining a training image point spread function for at least a portion of each of a plurality of training images, and extracting one or more training image features from each of the training image point spread functions to provide a plurality of training image features, the method comprising the steps of:
   analyzing the test image with a control system including a processor to calculate a test image point spread function for the test image;
   extracting, directly from the test image point spread function calculated by analyzing the test image, a test image feature with the control system; and
   comparing the test image feature to the classifier that was built using the plurality of training image features.

9. The method of claim 8 further comprising the step of building the classifier that distinguishes between training image features from training images with motion blur, and training image features from training images with defocus blur.

10. The method of claim 9 wherein the step of building the classifier includes the steps of (i) providing the plurality of training images to the control system, and (ii) analyzing the plurality of training images with the control system to extract the training image features for each of the training images.

11. The method of claim 10 wherein the step of analyzing the plurality of training images with the control system to extract the training image features includes determining a training image point spread function for at least a portion of each of the plurality of training images with the control system, and extracting, directly from each of the training image point spread functions determined by analyzing the training images, the training image features with the control system.

12. The method of claim 8 wherein the test image feature includes moments.

13. The method of claim 8 wherein the test image feature includes geometric features of the test image point spread function.

14. A device for classifying a test image utilizing a classifier that is built by determining a training image point spread function for at least a portion of each of a plurality of training images, and extracting one or more training image features from each of the training image point spread functions to provide a plurality of training image features, the device comprising:

a control system including a processor that (i) analyzes the test image to calculate a test image point spread function for the test image; (ii) extracts, directly from the test image point spread function calculated by analyzing the test image, a test image feature; and (iii) compares the test image feature to the classifier that was built using the plurality of training image features.

15. The device of claim 14 wherein the classifier distinguishes between training image features from training images with motion blur, and training image features from training images with defocus blur.

16. The device of claim 15 wherein the classifier is built by analyzing the plurality of training images with the control system to extract the training image features from each of the plurality of training images.

17. The device of claim 16 wherein analyzing the plurality of training images with the control system to extract the training image features includes determining a training image point spread function for at least a portion of each of the plurality of training images with the control system, and extracting, directly from each of the training image point spread functions determined by analyzing the training images, the training image features with the control system.

18. The device of claim 14 wherein the test image features include moments of the of the test image point spread function.

19. The device of claim 14 wherein the test image features include geometric features of the test image point spread function.

* * * * *